Figure 5:
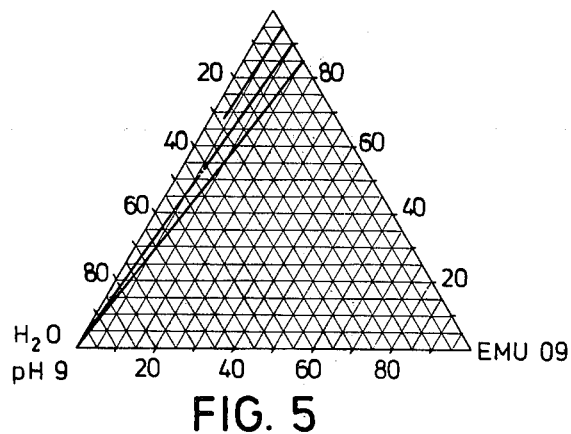

United States Patent [19]

Friberg et al.

[11] 4,122,051
[45] Oct. 24, 1978

[54] AQUEOUS MICROEMULSION OF ALKYD, MODIFIED ALKYD, OR POLYESTER BINDER AND EMULSIFIER

[75] Inventors: Stig Erik Friberg, Saltsjö-Boo; Elsa Gunilla Gillberg-La Force, Stockholm; Karl-Henry Falklin, Perstorp, all of Sweden

[73] Assignee: Perstorp AB, Perstorp, Sweden

[21] Appl. No.: 603,685

[22] Filed: Aug. 11, 1975

[30] Foreign Application Priority Data

Apr. 4, 1975 [SE] Sweden .................. 7503893

[51] Int. Cl.$^2$ .............................. C08J 3/06
[52] U.S. Cl. .................. 260/22 A; 252/312; 260/29.2 E
[58] Field of Search ............... 260/29.2 E, 22 A

[56] References Cited

U.S. PATENT DOCUMENTS

| | | | |
|---|---|---|---|
| 2,334,107 | 11/1943 | Light et al. | 260/29.2 E |
| 2,378,230 | 1/1945 | Little | 260/29.2 E |
| 3,070,256 | 12/1962 | Bremmer et al. | 260/29.2 E |
| 3,088,928 | 5/1963 | Berres et al. | 260/29.2 E |
| 3,207,623 | 9/1965 | Marzocchi et al. | 260/29.2 E |
| 3,345,313 | 10/1967 | Ruhf et al. | 260/29.2 E |
| 3,554,790 | 1/1971 | Gehman et al. | 260/29.2 E |
| 3,763,064 | 10/1973 | Soliday | 260/29.2 E |
| 3,879,327 | 4/1975 | Burke | 260/29.2 E |
| 4,052,331 | 10/1977 | Dumoulin | 260/29.2 M |

OTHER PUBLICATIONS

Winsor, "Journal of Colloid Science" vol. 10; 1955 pp. 88, 89, 99 & 100.
Becher, "Emulsions Theory and Practice" Second Ed. Reinhold, 1965 pp. 297, 298, 299, & 324.

*Primary Examiner*—Murray Tillman
*Assistant Examiner*—A. H. Koeckert
*Attorney, Agent, or Firm*—Young & Thompson

[57] ABSTRACT

The invention relates to a water-dilutable binder for lacquers and paints based on synthetic resins microemulsified in water by means of certain emulsifiers.

7 Claims, 7 Drawing Figures

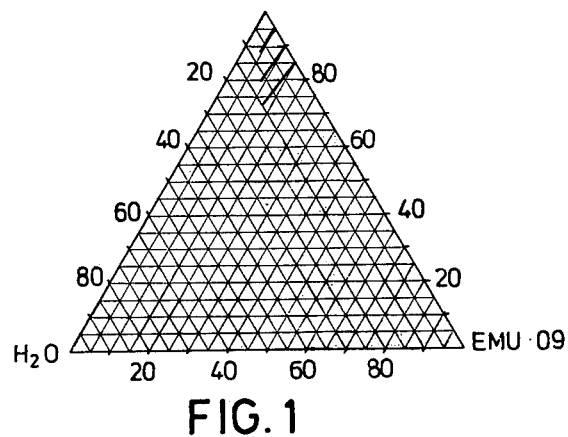
FIG. 1 COMPOSITION 1
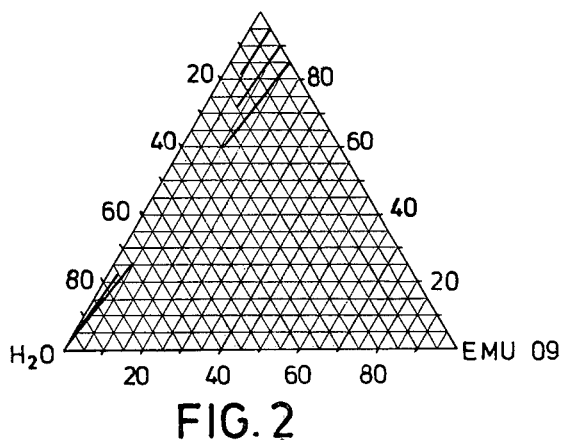
FIG. 2 COMPOSITION 2
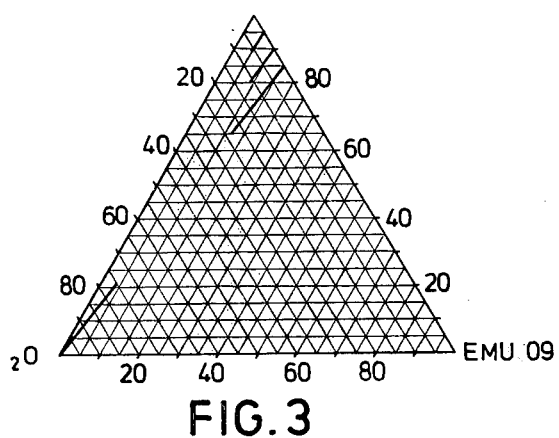
FIG. 3 COMPOSITION 3
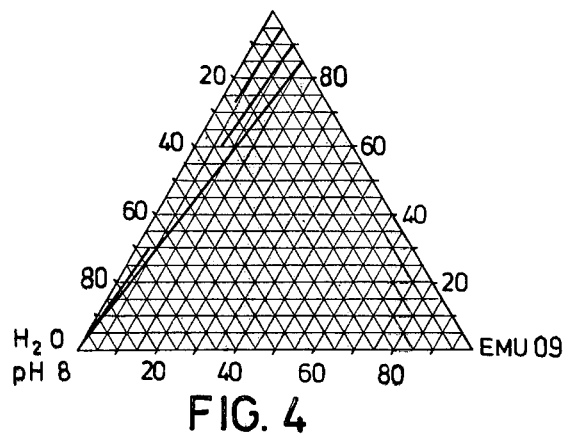
FIG. 4 COMPOSITION 4

AQUEOUS MICROEMULSION OF ALKYD, MODIFIED ALKYD, OR POLYESTER BINDER AND EMULSIFIER

The present invention relates to a water-dilutable binder for lacquers and paints which are based on synthetic resins.

The film-forming binders included in lacquers and paints have, to a great extent, been dissolved in a volatile organic solvent. Due to the rising costs of organic solvents, more stringent rules for allowed amounts of solvent in the air during painting and due to the explosion and fire risks which solvent vapors entail, an increasing number of attempts have been made to obtain binders which are dispersable or soluble in water. In many of the water-based paints present on the market today, the binder is included in the form of a dispersion: a latex which is obtained by means of emulsion polymerization. Disadvantages contained in latex paints are, inter alia, low paint film gloss and wet edge tendencies. Another way of obtaining water-based paints is to use water-soluble polymers as binders (cf. for example I. H. McEwan, "Role of water in Water-reducible Paint Formulations," Journal of Paint Technology 45, 33 (1973)). As a rule, the water-soluble polymers have a lower molecular weight and more ionizable groups than the polymers used in solvent-based paints and lacquers. An increased number of ionizable groups can, for example, be obtained if the esterification reaction in the production of a polyester or alkyd is interrupted at an earlier stage than normal. The water-resistance and hardness of films from water-soluble binders are, as a rule, low.

The intention of the present invention has been to eliminate the disadvantages of solvent-based and water-based binder systems known to date. This has been able to be achieved in a very satisfactory manner by means of using microemulsifying techniques.

Thus, the present invention relates to a water-dilutable binder for lacquers and paints based on synthetic resins, said binder being characterized by a resin having properties normal for resins in solvent-based systems, to which resin is added water, forming therewith a colloidal, thermodynamically stable solution, a so-called microemulsion, by means of an addition of one or more emulsifiers of such hydrophile-lipophile balance that the solubilizing power of the solution is of a sufficient level and to which resin, if desired, auxiliary agents for (1) neutralization of possible free acid groups of the resin and (2) viscosity regulation, coagulation and evaporation of the water during film formation are added. Thus, the application properties of the lacquer or paint can be easily regulated with conventional solvents for the resin.

In this connection, the term microemulsion refers to a colloidal, thermodynamically stable solution in which the dispersed "phase" has a particle size of less than 0.1 μ. Thus, in the absence of pigment, such a microemulsion is clear or a slightly cloudy solution. The structure can vary. Thus, the water can be either included in inverted micelles, so-called w/o microemulsions or $L_2$ solutions or constitute the continuous phase with the binder solubilized in normal micelles, so-called o/w microemulsions or $L_1$ solutions. In certain cases in which the water and organic phases of the polymer are more or less of the same magnitude and the emulsifier content is low, the structure of the microemulsion is most likely represented by irregular saddle figures. the microemulsion used according to the invention constitutes a colloidal micellar solution which is spontaneously formed as opposed to the so-called hydrosols which were introduced by E.I. du Pont de Nemours & Co. in the sixties (H. P. Beardsley and R. N. Selby, "Acrylic Hydrosols - A New Concept in Aqueous Coating Systems," Journal of Paint Technology 40, 263 (1968)) and in which the binder phase was dispersed to microdroplets by means of vigorous mechanical working.

The colloidal solutions, the microemulsions, have been found to have several technical uses and have been known since the forties (J. H. Schulman, Nature 1943). However, they have not been used within the paint and lacquer industry, presumably because the relatively great amount of emulsifier (15-25%) which, as a rule, was necessary in order to obtain microemulsions having equal amounts of water and organic phase, has been expected to result in impaired film properties and increased cost (the emulsifier content in the dried film is in these cases about 30%).

However, according to the present invention, microemulsion-based lacquers and paints can be produced while maintaining good lacquer and paint film properties despite the presence of emulsifiers.

Even if the invention can be used on specially synthesized water-soluble polyesters having acid numbers of 50-60, the invention is not primarily directed towards resins of this type. The advantages of the microemulsions used according to the invention are (1) that the same polymeric binder used in solvent-based paints can be used, (2) that the microemulsion constitutes a thermodynamically stable state within its temperature existence range and, thus, very little energy needs to be supplied during homogenization, (3) that no or a very small amount of organic solvents needs to be added and said solvents can be selected from solvents having low toxicity and solvents which are conventional for the resin in question, and (4) that films having high gloss are obtained.

The invention is described below for paints and lacquers whose binder is based on alkyds having an acid number of 5-30 which is typical for solvent-based alkyds. However, in principle the invention can just as well be applied to other binders of the polyester type such as acrylates, oil-free alkyds, polyesters, epoxy esters and modified alkyds, for example with polyurethane and/or epoxy. The resins should preferably have some free acid groups which, as a rule, is the case for these types of resins.

Inverted micellar-type microemulsified binder in which the water is confined in the micelles and in which the binder, is desired, together with an organic solvent constitutes the continuous "phase" can be produced with anionic, cationic, amphoteric and nonionic types of emulsifiers or mixtures thereof. Examples of suitable anionic type emulsifiers are organic acid salts of the type

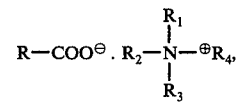

in which R consists of a saturated or unsaturated alkyl-, alkylaryl- or naphthenyl residue having at least 5 carbon atoms, and $R_1$, $R_2$, $R_3$ and $R_4$ can be the same or different and equal to H, $CH_3$, $C_2H_5$, $CH_2CH_2OH$, etc. Na- and K- salts of acids also provide good microemulsions but the chemical resistance of the cured films is then, as a rule, somewhat reduced. Cationic emulsifiers suitable for producing microemulsions of the binders are, for example, different organic amines having at least 5 carbon atoms and which have been neutralized by an inorganic or organic acid such as hydrochloric acid or acetic acid, for example octylammonium chloride or di-isobutylphenoxyethoxyethyldimethylbenzylammonium chloride (Hyamin 622) or alkylpyridinium salts, etc. Suitable nonionic emulsifiers are, for example, alkylphenylpolyethylene glycols, especially nonylphenylpolyethylene glycols having 6–16 ethylene oxide groups.

Especially suitable as emulsifiers are those emulsifiers in which either the emulsifier, the emulsifier ion or its anti-ion react, during curing, with the binder system. The emulsifier's OH groups can, for example, react with an added melamine or urea type convertible coating or, in the case of air-drying lacquers, emulsifiers whose hydrocarbon chain is unsaturated can be used.

The invention is described further below in connection with a number of examples, enclosed tables and drawings.

(a) A lean pelargonic alkyd resin having a 30% oil length (modifying additive) and having the gross composition 23.7% by weight pelargonic acid, 37.0% by weight trimethylol propane and 39.3% by weight phtalic acid anhydride, (b) a semi-fat tall fatty acid alkyd having a 50% oil length and the gross composition 48% by weight tall oil fatty acid, 25.0% by weight tetramethylol methane (Penta A), 26.0% by weight phtalic anhydride and 1.0% by weight maleic anhydride and (c) a fatty soya oil alkyd having a 53% oil length and the gross composition 61% by weight soya oil, 15% by weight Penta A and 24% by weight phthalic anhydride were used during the tests. Different $L_2$-microemulsions of the different alkyds are disclosed in tables 1–4 below with information about the emulsion, solvent, composition and viscosity.

The pelargonic alkyd was cured by means of the addition of a cross-linking resin. Peramin 3265 (Perstorp AB), which is a butanol-esterified melamine resin which is present as a 63% solution in butanol, was used as cross-linking resin. A ratio of alkyd resin to melamine resin of 80:20 (parts by weight) was used. $L_2$-microemulsions endured the intermixing of the crosslinking resins without breaking. The curing was effected at 150° C for 35 minutes. The results are summarized in Table 5.

The lacquer films were tested with respect to pendulum hardness prior to and after 2 hours' contact with water, pencil hardness and chemical resistance. Lacquer films obtained from microemulsions whose emulsifier consisted of fatty acid salts of amines or ammonia yielded lacquer films which had at least equally good properties as when the alkyd was dissolved in its traditional solvent consisting of xylene and butanol. Lacquer films obtained with microemulsions having ammonium laurate as emulsifier had greater pendulum hardness after contact with water than lacquer films based on solvent.

Figure 6:
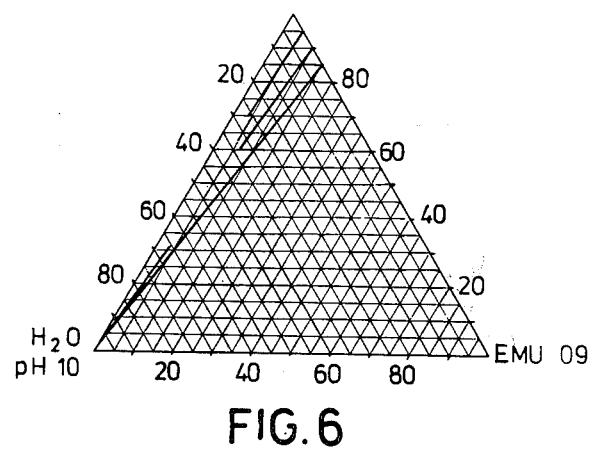
Figure 7:
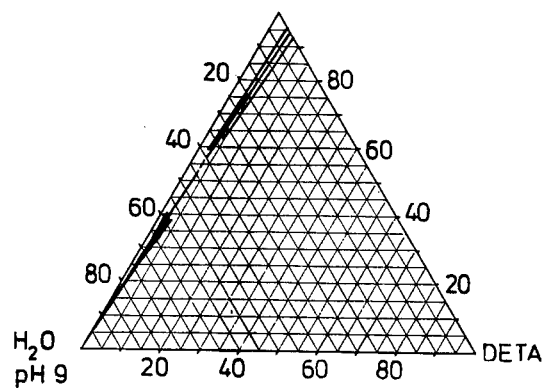

Especially preferred microemulsions which can be diluted infinitely or at least to 70% with water can be obtained with the help of nonionic emulsifiers, especially alkyl or alkylphenylpolyethyleneglycol ether-type emulsifiers together with a well-balanced amount of base and minor amounts of an alcohol, ethyl glycol (ethyleneglycol monoethyl ether) or another solvent which is conventional for the alkyd. The organic solvent was added in order to achieve a workable lacquer viscosity. Table 4 shows microemulsions of soya oil alkyd which, obtained by means of different nonylphenylpolyglycol ethers (Berol Kemi AB). If pure water is replaced by water containing a base and if the emulsifier-base ratio is balanced well, infinitely dilutable alkyds could be obtained. The sensitivity in this ratio is shown in FIGS. 1–7 in which the drawn lines represent isotropic solutions and in which a nonylphenylpolyethyleneglycol ether having approx. 10 ethylene oxide groups (EMU 09) is used as an emulsifier and diethanolamine (DETA) is used as a base.

Lacquer mixture 1 consisted of 7.0 g pelargonic alkyd, 3.0 g tall fatty acid alkyd, 1.0 g ethanol and 0.333 g DETA. The alkyd-DETA ratio was approx. 30:1. Lacquer mixture 2 consisted of 7.0 g pelargonic alkyd, 3.0 g tall fatty acid alkyd, 1.0 g ethanol and 0.667 g DETA. The alkyd-DETA ratio was 15:1. Lacquer mixture 3 consisted of 7.0 g pelargonic alkyd, 3.0 g tall fatty acid alkyd, 1.0 g ethanol and 1.0 g DETA. The alkyd-DETA ratio was 10:1. Lacquer mixture 4 consisted of 7.0 g pelargonic alkyd, 3.0 g tall fatty acid alkyd, 2.5 g ethanol and 0.833 g DETA. The alkyd-DETA ratio was 12:1. Lacquer mixture 5 consisted of 7.0 g pelargonic alkyd, 3.0 g tall fatty acid alkyd, 2.5 ethanol and 1.2 g EMU 09.

If baking alkyd varnishes were used, a water-soluble cross-linking resin had to be used so that the microemulsion would not break during the addition of the cross-linking resin. In the case of air-drying alkyds, solvent-free siccatives should be used. Some examples of lacquer mixtures produced with the help of binders, which have been microemulsified in water according to the invention, are presented below.

EXAMPLE 1

7.0 g pelargonic alkyd, 3.0 g tall fatty acid alkyd, 2.5 g ethanol, 0.8 g diethanolamine and 1.4 g nonylphenylpolyethyleneglycol ether having approx. 10 ethylene oxide units (EMU 09 from Berol Kemi AB, Sweden) was heated and homogenized. Water containing diethanolamine was added to the obtained lacquer mixture so that the pH of the water was 9. The lacquer mixture was infinitely dilutable. A water-soluble melamine resin (Cibamin M100) was added to a sample supplied with water to a water concentration of 50% so that an alkyd-melamine ratio of 85:15 was obtained. Traces of p-toluene sulphonic acid was added as a catalyst. The clear isotropic solution had somewhat high viscosity and, thus, further ethanol was added before coating and curing were carried out. Curing took place at 150° C for a period of 30 minutes. The cured film was clear, glossy and smooth and had good chemical resistance. Tools and containers could be cleaned with running water.

EXAMPLE 2

10 g pelargonic alkyd, 2.5 g ethanol, 0.9 g triethanolamine and 1.4 g EMU 09 were mixed, whereupon 70% water having a pH of 9 (regulated with triethanol amine) was added. A crosslinking resin (Cibamin ML 1000 GB) was added so that an alkydmelamine ratio of 85:15 was obtained. The isotropic solution was spread out and cured completely to a hard and glossy film at 80° C during a period of 60 minutes.

EXAMPLE 3

10 g tall fatty acid alkyd, 2.5 g ethyleneglycolmonoethylether (ethylglycol), 0.6 g diethanolamine and 1.4 g Wasc (see below) were mixed and homogenized by means of reheating at raised temperature. Water having a pH of 9 due to the addition of diethanolamine was added during stirring. Even after "infinite dilution," the solution was clear and isotropic. (WASC is a nonylphenylpolyethylene glycol having approx. 12 ethylene oxide groups from Berol Kemi AB, Sweden).

EXAMPLE 4

8 g pelargonic alkyd, 2 g ethanol, 1.0 g Berol 296 (nonylphenylpolyethylene glycol having approx. 16 ethylene oxide groups) and 0.8 g diethanolamine were mixed together, whereupon water having a pH of 9 was added to the mixture. The microemulsion could be infinitely diluted without any phase separation taking place.

EXAMPLE 5

8.0 g soya oil alkyd, 2.0 g ethylglycol and 1.0 g Wasc were mixed together, whereupon 0.2 g diethanolamine was added to the mixture. Water having a pH of 10 (diethanolamine) was added. An infinite dilutability was obtained.

EXAMPLE 6

8 g soya oil alkyd, 2 g ethylglycol, 0.25 g of a mixture consisting of 20 g 25%-ish ammonium and 3 g sodium hydroxide and 1.4 g EMU 09 were mixed together and diluted with distilled water to 50% water content.

EXAMPLE 7

Pelargonic alkyd and tall fatty acid alkyd were mixed under heating with ethanol, whereupon the warm, highly liquid lacquer solution was added dropwise under reheating to a concentrated pigment paste consisting of 68% $TiO_2RCR_3$, 10% tall fatty acid alkyd and 22 % ethylglycol. Melamine (Cibamin M 100), EMU 09, diethanolamine and water having a pH of 9 were thereafter added to the mixture. The resulting microemulsified alkyd paint had the following composition: 50 g pelargonic alkyd, 1.7 g tall fatty acid alkyd, 18 g Cibamin M 100, 33 g pigment paste, 10 g EMU 09, 7 g diethanolamine, 30 g ethanol and 100 g diethanolamine-aqueous solution having a pH of 9. The paint was spread out and cured at a temperature of 150° C during a period of 30 minutes. A white, glossy and fault-free paint film was obtained. Brushes and paint cans could be washed by means of rinsing under running water.

EXAMPLE 8

8.0 g pelargonic alkyd, 1.0 g ethylglycol, 1.0 g EMU 09 and 0.3 g diethanolamine were homogenized, whereupon a microemulsion was obtained by means of the addition of water, the pH of which had been regulated to 9 with the help of diethanolamine, during light stirring. The water content could be varied from 0-100% while maintaining a clear isotropic solution. After the addition of water-soluble cross-linking resin to a 50% microemulsion and curing, a totally clear lacquer having no tendency of yellowing was obtained.

EXAMPLE 9

8.0 g pelargonic alkyd, 2.0 g ethylglycol, 1.0 g EMU 09 and 0.1 g DETA + 0.2 g concentrated ammonium solution were microemulsified with 50% water, whereupon a cross-linking resin (Cibamin ML 1000 GB) was added in an alkyd cross-linking resin ratio of 80:20. After curing at a temperature of 140° C during a period of 40 minutes, a clear film which had good water- and acetone-resistance was obtained.

EXAMPLE 10

The experiment in test 9 was repeated but the ammonium was replaced by sodium hydroxide. The obtained film was, after curing, clear but somewhat soft and, after 2 hours' contact with water, became very soft and bluish.

EXAMPLE 11

Water was added to a mixture of 8.0 g pelargonic alkyd, 2.0 g ethanol, 1.0 g Wasc, 0.2 g DETA and 0.2 g $Al(OH)_3$. A microemulsion which could be water diluted up to 100% was obtained.

EXAMPLE 12

In order to investigate what types of non-ionic emulsifiers provided clear microemulsions at room temperature, a series of experiments were carried out having the following standard recipe: 8.0 g pelargonic alkyd, 2.0 g ethylglycol, 0.5 g diethanolamine, 1.0 g emulsifier and 0-100% water having a pH of 9.

The following types of non-ionic emulsifiers were tested:

A. Fat alcohol polyethyleneoxide adducts in which the fatty alcohol is constituted by a commercial mixture of $C_{12}$- and $C_{14}$-alcohols. Isotropic aqueous solutions with 0-100% water at room temperature were obtained if the average amount of ethyleneoxide groups lay between 4 and 16. Those having more ethyleneoxide groups provided infinitely dilutable solutions first at higher temperatures. (This is typical for all non-ionic emulsifiers, as their maximum solubilizing ability is obtained near their "phase inversion temperature" (PIT) which is directly dependent on the length of the ethyleneoxide chain.) Examples of commercial emulsifiers are Berol 056, 060 and 057.

B. Fatty alcohol polyethyleneglycol ethers based on $C_{16}$-$C_{20}$-fatty alcohols. These provide totally isotropic aqueous solutions to approx. 50% water at room temperature. Commerical emulsifiers having 4 (Berol 063), 6 (Berol 064), 10 (Berol 065) and 18 (Berol 070) ethyleneoxide groups were tested. At increased temperatures, further water could be microemulsified with the two latter emulsifiers.

C. Ethyleneoxide adducts of sorbitan monoesters. Commercial emulsifiers tested were the monolaurate ester (TWEEN 20) and the monopalmitate ester (TWEEN 40) having, on an average, 20 ethyleneoxide groups per molecule. Infinitely dilutable microemulsions at room temperature were obtained in both cases.

D. Nonylphenylpolyethyleneglycol esters. Commercial emulsifiers tested at room temperature and which yielded infinitely dilutable microemulsions were those having, on an average, 8 (Berol 267), 10 (Berol 09), 12 (Wasc) and 16 (Berol 296) ethyleneoxide groups.

E. Special non-ionic emulsifiers. Certain specially-synthesized non-ionic emulsifiers were also tested, namely a hexanol derivative having 2 propyleneoxide units and 4 ethyleneoxide units thereon. Said emulsifier yielded infinitely dilutable microemulsions at room temperature. The ethyleneoxide adduct of ethanol having, on an average, 7 ethyleneoxide groups yielded, at room temperature, a microemulsion having at most 18% water. On the other hand, further water could be microemulsified at lower temperatures.

Table I

Composition of water solutions of 100% short pelargonic alkyd - 30% oil length (O.L.)

| No | Emulsifier | Solvent | Alkyd | Emulsifier | Water | Solvent | Viscosity (Gardner) | Remarks |
|---|---|---|---|---|---|---|---|---|
| 1 | Octylammoniumchloride | n-Butanol | 59.9 | 13.0 | 9.0 | 18.1 | > G-H | Yellow, corresponds to 1:7 |
| 2 | " | " | 50.9 | 11.0 | 7.6 | 30.5 | ≈ G-H | Yellowish |
| 3 | | 1-aminopropanol | 49.7 | | 5.6 | 44.7 | > G-H | Corresponds to ≈ 1:8 hard foaming |
| 4 | Hyamin | Methanol | 72.2 | 12.3 | 6.9 | 8.7 | >> G-H | |
| 5 | " | " | 65.8 | 11.2 | 6.3 | 16.7 | > G-H | |
| 6 | " | " | 62.2 | 10.6 | 6.0 | 21.2 | ≈ G-H | |
| 7 | " | " | 57.3 | 9.8 | 5.5 | 27.4 | ≈ G-H | Corresponds to 1:17 |
| 8 | " | " | 50.3 | 8.6 | 4.8 | 36.3 | < G-H | |
| 9 | " | Ethanol | 66.1 | 11.5 | 10.4 | 12.0 | > G-H | |
| 10 | " | " | 59.8 | 10.4 | 9.4 | 20.4 | > G-H | |
| 11 | " | " | 54.6 | 9.5 | 8.6 | 27.3 | ≈ G-H | |
| 12 | " | " | 50.2 | 8.7 | 7.9 | 33.1 | ≈ G-H | Corresponds to 1:18 |
| 13 | " | n-Butanol | 45.9 | 11.7 | 13.2 | 29.2 | ≈ G-H | Corresponds to ≈ 1:6 |
| 14 | Hyamin:Aerosol AY | " | 37.5 | 9.4:0.2 | 12.3 | 41.7 | < G-H | Corresponds to 1:6:1 |
| 15 | META-capronate | " | 68.5 | 10.8 | 15.2 | 5.5 | >> G-H | |
| 16 | " | " | 63.1 | 9.9 | 14.0 | 12.9 | > G-H | |
| 17 | " | " | 57.6 | 9.1 | 12.8 | 20.5 | ≈ G-H | Corresponds to 1:21 |
| 18 | META-capronate | n-Butanol | 51.1 | 8.1 | 11.4 | 29.4 | < G-H | Yellowish |
| 19 | META-caprylate | " | 51.0 | 8.3 | 21.6 | 19.1 | > G-H | |
| 20 | " | " | 47.3 | 7.7 | 20.0 | 25.0 | ≈ G-H | Corresponds to 1:22 yellowish |
| 21 | META-caprinate | " | 70.0 | 5.5 | 8.2 | 16.3 | > G-H | |
| 22 | " | " | 66.3 | 5.2 | 7.8 | 20.8 | ≈ G-H | Corresponds to 1:26 |
| 23 | " | " | 52.5 | 4.1 | 6.2 | 37.2 | < G-H | Yellowish |
| 24 | Na-caprylate | Ethanol | 58.0 | 10.4 | 17.4 | 14.1 | >> G-H | |
| 25 | " | " | 55.0 | 9.9 | 16.5 | 18.6 | > G-H | |
| 26 | " | " | 50.7 | 9.1 | 15.2 | 25.0 | ≈ G-H | Corresponds to 1:11 |
| 27 | " | n-Propanol | 57.7 | 10.4 | 17.3 | 14.6 | >> G-H | |
| 28 | " | " | 54.9 | 9.9 | 16.5 | 18.8 | > G-H | |
| 29 | " | " | 50.7 | 9.1 | 15.2 | 25.0 | ≈ G-H | Corresponds to 1:12 |
| 30 | " | n-Butanol | 48.1 | 8.6 | 14.4 | 28.8 | ≈ G-H | Corresponds to 1:1–5 |
| 31 | " | iso-Butanol | 57.0 | 10.3 | 17.1 | 15.7 | >> G-H | |
| 32 | " | " | 53.3 | 9.6 | 16.1 | 21.0 | > G-H | |
| 33 | " | " | 50.2 | 9.0 | 15.1 | 25.7 | ≈ G-H | Corresponds to 1:14 |
| 34 | " | Ethylmethylketone | 57.2 | 10.2 | 17.0 | 15.6 | > G-H | |
| 35 | Na-caprylate | Ethylmethylketone | 54.3 | 9.7 | 16.2 | 19.8 | ≈ G-H | |
| 36 | " | " | 50.9 | 9.1 | 15.2 | 24.9 | < G-H | Corresponds to 1:15 |
| 37 | " | Methylisobutylketone | 53.0 | 9.5 | 15.9 | 21.7 | > G-H | |
| 38 | " | " | 50.8 | 9.1 | 15.2 | 25.0 | ≈ G-H | Corresponds to 1:25 |
| 39 | " | Cyklohexanone | 53.7 | 9.8 | 16.1 | 20.4 | >> G-H | |
| 40 | " | " | 50.1 | 9.1 | 15.1 | 25.7 | > G-H | Corresponds to 1:24 |
| 41 | " | Ethyleneglycol-monoethylether | 52.3 | 9.5 | 15.7 | 22.5 | >> G-H | |
| 42 | " | " | 49.8 | 9.1 | 14.9 | 26.3 | > G-H | |
| 43 | Na-laurate | Ethanol | 57.8 | 10.3 | 17.2 | 14.7 | >> G-H | |
| 44 | " | " | 54.0 | 9.6 | 16.1 | 20.3 | > G-H | |
| 45 | " | " | 50.4 | 9.0 | 15.0 | 25.6 | ≈ G-H | Not stable |
| 46 | NH$_4$-laurate | " | 54.2 | 9.6 | 16.1 | 20.1 | > G-H | |
| 47 | " | " | 51.9 | 9.2 | 15.5 | 23.4 | ≈ G-H | |
| 48 | " | " | 50.0 | 8.9 | 14.9 | 26.3 | ≈ G-H | |

Table 2

Isotropic solutions of pelargonic alkyd - 30% OL

| No. | Emulsifier | Solvent | Alkyd | Emulsifier | Water | Solvent | Viscosity (Gardner) | Remarks |
|---|---|---|---|---|---|---|---|---|
| 49 | META-capronate | Ethanol | 62.8 | 9.7 | 13.3 | 14.2 | >> G-H | Yellowish |
| 50 | " | " | 57.1 | 8.8 | 12.1 | 22.0 | > G-H | " |
| 51 | " | " | 51.0 | 7.9 | 10.8 | 30.3 | ≈ G-H | " |
| 52 | META-caprylate | " | 51.9 | 8.8 | 15.5 | 23.8 | > G-H | |
| 53 | " | " | 48.8 | 8.3 | 14.6 | 28.2 | ≈ G-H | Not stable |
| 54 | META-caprinate | " | 77.8 | 6.4 | 9.3 | 6.6 | >> G-H | Yellowish |
| 55 | " | " | 70.7 | 5.8 | 8.4 | 15.1 | > G-H | " |
| 56 | " | " | 62.0 | 5.1 | 7.4 | 25.5 | ≈ G-H | " |
| 57 | " | " | 55.3 | 4.6 | 6.6 | 33.5 | < G-H | " |
| 58 | " | " | 52.1 | 4.3 | 6.2 | 37.4 | < G-H | " |
| 59 | Hyamin | " | 45.5 | 3.8 | 8.4 | 42.4 | < G-H | Not stable |
| 60 | " | " | 53.8 | 4.0 | 10.0 | 32.2 | ≈ G-H | |
| 61 | " | " | 50.4 | 8.7 | 7.9 | 33.0 | ≈ G-H | = 12,Table 1 |
| 62 | META-naphtenate (225) | " | 63.4 | 11.9 | 19.1 | 5.6 | >> G-H | Brown |
| 63 | " | " | 58.1 | 10.9 | 17.4 | 13.6 | > G-H | " |
| 64 | " | " | 52.9 | 9.9 | 15.9 | 21.4 | ≈ G-H | " |
| 65 | " | " | 49.3 | 9.3 | 14.8 | 26.6 | ≈ G-H | " |
| 66 | | " | 50.0 | | | 50.0 | ≈ G-H | |
| 67 | | Methanol | 50.0 | | | 50.0 | ≈ G-H | |
| 68 | | Xylen:n-Butanol 5:1 | 50.0 | | | 50.0 | G-H | |

Table 2-continued

Isotropic solutions of pelargonic alkyd - 30% OL

| No. | Emulsifier | Solvent | % Composition Alkyd | Emulsifier | Water | Solvent | Viscosity (Gardner) | Remarks |
|---|---|---|---|---|---|---|---|---|
| 69 | META-capronate | Ethanol | 50.4 | 9.5 | 12.0 | 28.0 | ≈ G-H | Yellowish |
| 70 | DETA-capronate | " | 49.9 | 9.0 | 11.3 | 29.7 | ≈ G-H | — |
| 71 | TETA-capronate | " | 55.5 | 9.8 | 11.9 | 22.7 | > G-H | Yellowish |
| 72 | " | " | 42.7 | 7.6 | 12.6 | 37.1 | ≈ G-H | " |
| 73 | META-caprylate | " | 50.2 | 9.1 | 12.8 | 27.9 | ≈ G-H | |
| 74 | DETA-caprylate | " | 49.4 | 9.1 | 11.9 | 29.6 | ≈ G-H | |
| 75 | TETA-caprylate | " | 48.4 | 8.9 | 10.7 | 31.7 | ≈ G-H | Yellowish |
| 76 | Hyamin | " | 50.1 | 8.7 | 12.2 | 29.0 | ≈ G-H | max H$_2$O min EtOH |
| 77 | NH$_4$-capronate | " | 77.6 | 13.9 | 8.4 | — | | |
| 78 | " | " | 73.2 | 13.2 | 9.6 | 4.1 | | |
| 79 | " | " | 64.1 | 11.5 | 11.3 | 13.1 | | |
| 80 | " | " | 56.6 | 10.2 | 12.4 | 20.8 | | |
| 81 | " | " | 49.9 | 8.9 | 13.1 | 28.0 | | |
| 82 | NH$_4$-capronate | Ethanol | 44.1 | 7.9 | 13.3 | 34.8 | | Not stable |
| 83 | NH$_4$-caprylate | " | 70.9 | 13.6 | 10.3 | 5.2 | | |
| 84 | " | " | 66.4 | 12.7 | 12.3 | 8.7 | | |
| 85 | " | " | 60.2 | 11.5 | 13.5 | 14.8 | | |
| 86 | " | " | 53.7 | 10.3 | 14.2 | 21.8 | | |
| 87 | " | " | 48.5 | 9.3 | 14.8 | 27.5 | | |
| 88 | " | " | 43.6 | 8.3 | 15.0 | 32.9 | | Not stable |
| 89 | NH$_4$-caprinate | " | 62.3 | 11.3 | 12.4 | 14.0 | | |
| 90 | " | " | 57.5 | 10.4 | 13.7 | 18.4 | | |
| 91 | " | " | 52.4 | 9.5 | 14.5 | 23.6 | | |
| 92 | " | " | 45.2 | 8.2 | 14.5 | 32.1 | | |
| 93 | " | " | 41.0 | 7.4 | 14.7 | 36.9 | | |
| 94 | " | " | 36.7 | 6.6 | 14.6 | 42.1 | | Not stable |
| 95 | NH$_4$-laurate | " | 66.3 | 12.4 | 9.4 | 11.9 | | |
| 96 | " | " | 60.2 | 11.3 | 13.3 | 15.3 | | |
| 97 | " | " | 55.5 | 10.4 | 14.5 | 19.7 | | |
| 98 | " | " | 50.2 | 9.4 | 15.6 | 24.8 | | |
| 99 | " | " | 46.1 | 8.6 | 16.1 | 29.2 | | |
| 100 | " | " | 40.8 | 7.6 | 15.9 | 35.6 | | Not stable |

Table 3

Isotropic solutions of tall fatty acid alkyd - 50% O.L.

| Sample No. | Emulsifier | Composition - weight % Alkyd | Emulsifier | Water |
|---|---|---|---|---|
| 1 | Na-capronate C$_6$ | 65.5 | 11.9 | 22.6 |
| 2 | META- " | 66.2 | 11.9 | 22.0 |
| 3 | DETA- " | 61.9 | 14.0 | 24.0 |
| 4 | TETA- " | 63.7 | 14.9 | 21.3 |
| 5 | Na-caprylate C$_8$ | 50.0 | 9.0 | 41.0 |
| 6 | K- " | 63.5 | 11.5 | 25.0 |
| 7 | NH$_4^+$- " | 64.9 | 15.5 | 19.5 |
| 8 | TMA$^+$- " | 56.7 | 12.6 | 30.7 |
| 9 | META- " | 52.7 | 9.9 | 37.4 |
| 10 | DETA- " | 56.6 | 10.3 | 33.1 |
| 11 | TETA- 10 " | 57.6 | 10.5 | 31.8 |
| 12 | META-caprinate C$_{10}$ | 56.0 | 10.2 | 33.8 |
| 13 | Na-laurate C$_{12}$ | 60.4 | 10.7 | 28.9 |
| 14 | META- " | 67.6 | 12.1 | 20.4 |
| 15 | DETA- " | 67.3 | 12.2 | 20.3 |
| 16 | TETA- " | 65.3 | 11.6 | 23.1 |
| 17 | Na-DVBS | 65.4 | 11.6 | 22.9 |
| 18 | META- " | 62.3 | 16.8 | 20.9 |
| 19 | DETA- " | 62.6 | 16.7 | 20.7 |
| 20 | TETA- " | 62.7 | 16.5 | 20.8 |
| 21 | META-DHBS | 64.0 | 16.7 | 19.3 |
| 22 | DETA- " | 63.7 | 17.5 | 18.9 |
| 23 | TETA- " | 64.0 | 16.7 | 19.4 |
| 24 | META-DMFS | 58.8 | 19.4 | 21.7 |
| 25 | DETA- " | 55.8 | 20.4 | 23.6 |
| 26 | TETA- " | 51.6 | 19.1 | 29.3 |
| 27 | META-capronate: TETA-capronate = 1:1 | 56.7 | 15.9 | 27.4 |
| 28 | META-caprylate: TETA-caprylate = 1:1 | 54.1 | 10.8 | 35.0 |
| 29 | META-capronate: TETA-caprylate = 1:1 | 64.5 | 12.8 | 22.6 |
| 30 | META-caprylate: TETA-capronate = 1:1 | 64.5 | 12.8 | 22.6 |
| 31 | Na-octylsulphate | 64.5 | 11.6 | 23.9 |
| 32 | "Berol 056" (C$_{12}$, 4EO) | 48.3 | 37.1 | 14.5 |
| 33 | "Berol 06" (C$_{12}$, 6EO) | 50.8 | 34.2 | 15.0 |
| 34 | "Berol 057" (C$_{12}$, 16EO) | 56.2 | 27.1 | 16.8 |
| 35 | "Hexanol"-2PO-4EO | 52.3 | 32.0 | 15.7 |

Table 4

Isotropic water solutions of soya oil alkyd - 63% O.L.

| Sample | Emulsifier | Base | Alcohol | Composition weight % Lacquer | Emulsifier | Base | Alcohol | Water | Emu/lacquer | Remarks |
|---|---|---|---|---|---|---|---|---|---|---|
| SoA 18 | "Emu 09" | DETA | E + OH | 26.5 | 5.6 | Excess | 2.8 | 65.0 | 0.21 | Clear, easy flowing, L$_1$ |
| SoA 19 | " | TMAOH | " | 32.6 | 7.0 | 8.9 | 5.3 | 46.0 | 0.22 | Clear, separates during storage |
| SoA 20 | " | " | " | 33.8 | 7.4 | 2.3 | 5.6 | 50.9 | 0.22 | Clear, easy flowing, L$_1$ |
| SoA 22 | " | NH$_3$ | " | 42.4 | 11.5 | 2.9 | 6.9 | 35.4 | 0.27 | Clear, highly viscous |
| SoA 23 | "Emu 02" | " | " | 77.3 | 8.5 | 1.0 | 8.4 | 2.9 | 0.11 | Clear, high viscous, L$_2$ |
| SoA 26 | "Emu 09" | " | " | 50.0 | 10.8 | 0.25 | 8.1 | 30.6 | 0.22 | Clear, somewhat high viscosity |
| SoA 27 | " | TMAOH | " | 50.0 | 10.8 | 0.25 | 8.1 | 30.6 | 0.22 | Clear, somewhat high viscosity |
| SoA 28 | "Wasc" | NH$_3$ | " | 50.0 | 12.0 | 1.1 | 5.4 | 31.5 | 0.24 | Clear, somewhat high viscosity |
| SoA 29 | " | NH$_3$/TMAOH | " | 52.3 | 6.3 | 1.1 | 5.6 | 34.6 | 0.12 | Clear, rel. high viscous, a little unstable |
| SoA 30 | " | " | " | | | | | ≈ 40 | 0.12 | "SoA 29" diluted with more H$_2$O, clear |
| SoA 34 | " | TMAOH | " | 51.9 | 5.6 | 0.7 | 8.5 | 33.2 | 0.11 | Clear, viscous |
| SoA 35 | " | " | " | 51.9 | 5.6 | 0.7 | 14.1 | 27.5 | 0.11 | Clear, less viscous |
| SoA 37 | DETA-linolate | DETA | Hexanol | 50.8 | 9.9 | 2.7 | 24.8 | 11.6 | 0.20 | Clear, easy flowing, L$_2$ |

Table 5

Spreading of pelargonic alkyd (to microemulsions with the composition below was added the hardener "Peramin 3265" (Perstorp AB) to obtain a ratio alkyd-hardener of 80–20 on dry basis)

| Emulsifier | Solvent | Composition % Alkyd | Emulsifier | Water | Solvent | Hardening temp. °C | Hardening time min. | Appearance of lacquer film | Alcoholtest | Acetonetest |
|---|---|---|---|---|---|---|---|---|---|---|
| | Xylen:n.but. 5:1 | 50 | | | 50 | 150 | 35 | Clear, colourless | No blistering, less soft | No blistering, soft |
| | Ethanol | 50 | | | 50 | 150 | 35 | " " | " " | " " |
| Hyamin | " | 50.2 | 8.7 | 7.9 | 33.1 | 150 | 35 | " " | — | The film raised |
| META-capronate | n-Butanol | 57.6 | 9.1 | 12.8 | 20.5 | 150 | 35 | Clear, yellowish | No blistering, less soft | No blistering, soft |
| Hyamin | Ethanol | 53.8 | 4.0 | 10.0 | 32.2 | 150 | 35 | Clear, colourless | — | The film raised |
| META-capronate | " | 50.4 | 9.5 | 12.0 | 28.0 | 150 | 35 | Clear, yellowish | No blistering, soft | No blistering, soft |
| DETA-capronate | " | 49.9 | 9.0 | 11.3 | 29.7 | 150 | 35 | Clear, colourless | No blistering, less soft | " " |
| TETA-capronate | " | 42.7 | 7.6 | 12.6 | 37.1 | 150 | 35 | Clear, yellowish | No blistering, soft | " " |
| META-caprylate | " | 50.2 | 9.1 | 12.8 | 27.9 | 150 | 35 | Clear, yellowish | " " | " " |
| DETA-caprylate | " | 49.4 | 9.1 | 11.9 | 29.6 | 150 | 35 | Clear, colourless | No blistering, less soft | " " |
| TETA-caprylate | " | 48.4 | 8.9 | 10.7 | 31.7 | 150 | 35 | Clear, yellowish | No blistering, soft | " " |
| NH$_4$-laurate | " | 50.0 | 8.9 | 14.9 | 26.3 | 150 | 35 | Clear, colourless | " " | " " |

What we claim is:

1. A water-dilutable binder for lacquers and paints based on synthetic resins, consisting essentially of a resin which is selected from the group consisting of alkyd, polyester and modified alkyd and which is soluble in organic solvents and which has an acid number of between 5 and 30 mg KOH/g, water forming with the resin a colloidal, thermo-dynamically stable solution in the form of a microemulsion, and at least one emulsifier having a hydrophile-lipophile balance such that the solubilizing power of the solution is such that the microemulsion forms spontaneously with a dispersed phase having a particle size less than 0.1 μ.

2. A binder according to claim 1, characterized in that the emulsifier is of the anionic, cationic, amphoteric or non-ionic type or a mixture thereof.

3. A binder according to claim 2, characterized in that the emulsifier is an amine- or ammonium salt of a medium carbon chain length fatty acid.

4. A binder according to claim 3, characterized in that the emulsifier is an ammonium- or diethanolamine salt of capric acid.

5. A binder according to claim 2, characterized in that the emulsifier is an alkyl- or alkylphenylpolyglycol ether and that the free acidic groups of the resin have been neutralized with a base.

6. A binder according to claim 2, characterized in that the emulsifier is a nonylphenylpolyglycol ether having 6–12 ethyleneoxide groups and that the base consists of an organic amine.

7. A binder according to claim 2, characterized in that the emulsifier is a nonylphenylpolyglycol ether having 8–12 ethyleneoxide groups and that the base consists of a diethanolamine.

* * * * *